No. 648,370. Patented May 1, 1900.
G. AIMONT.
VALVE MECHANISM.
(Application filed Dec. 30, 1897.)
(No Model.) 4 Sheets—Sheet 2.

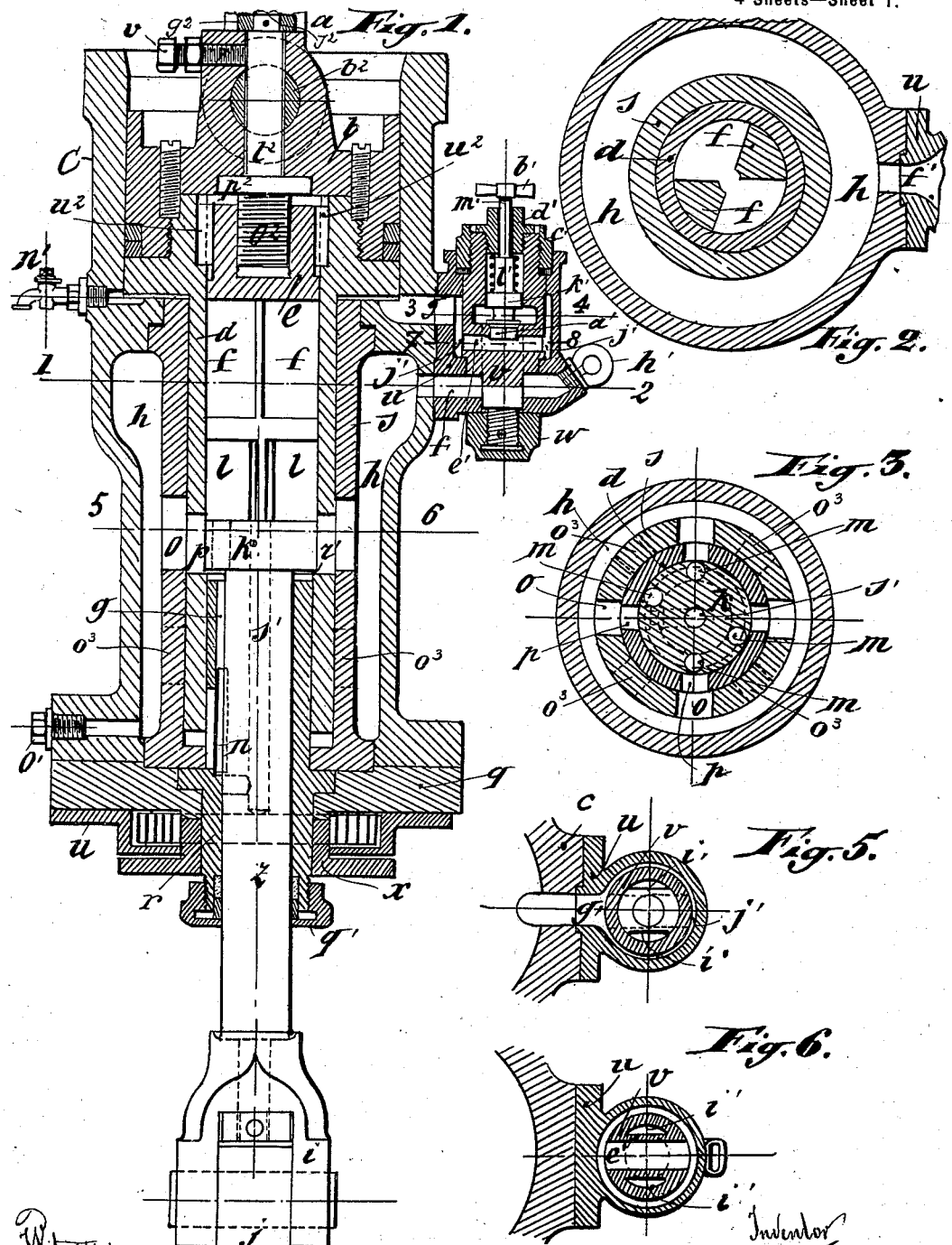

No. 648,370. Patented May 1, 1900.
G. AIMONT.
VALVE MECHANISM.
(Application filed Dec. 30, 1897.)
(No Model.) 4 Sheets—Sheet 3.
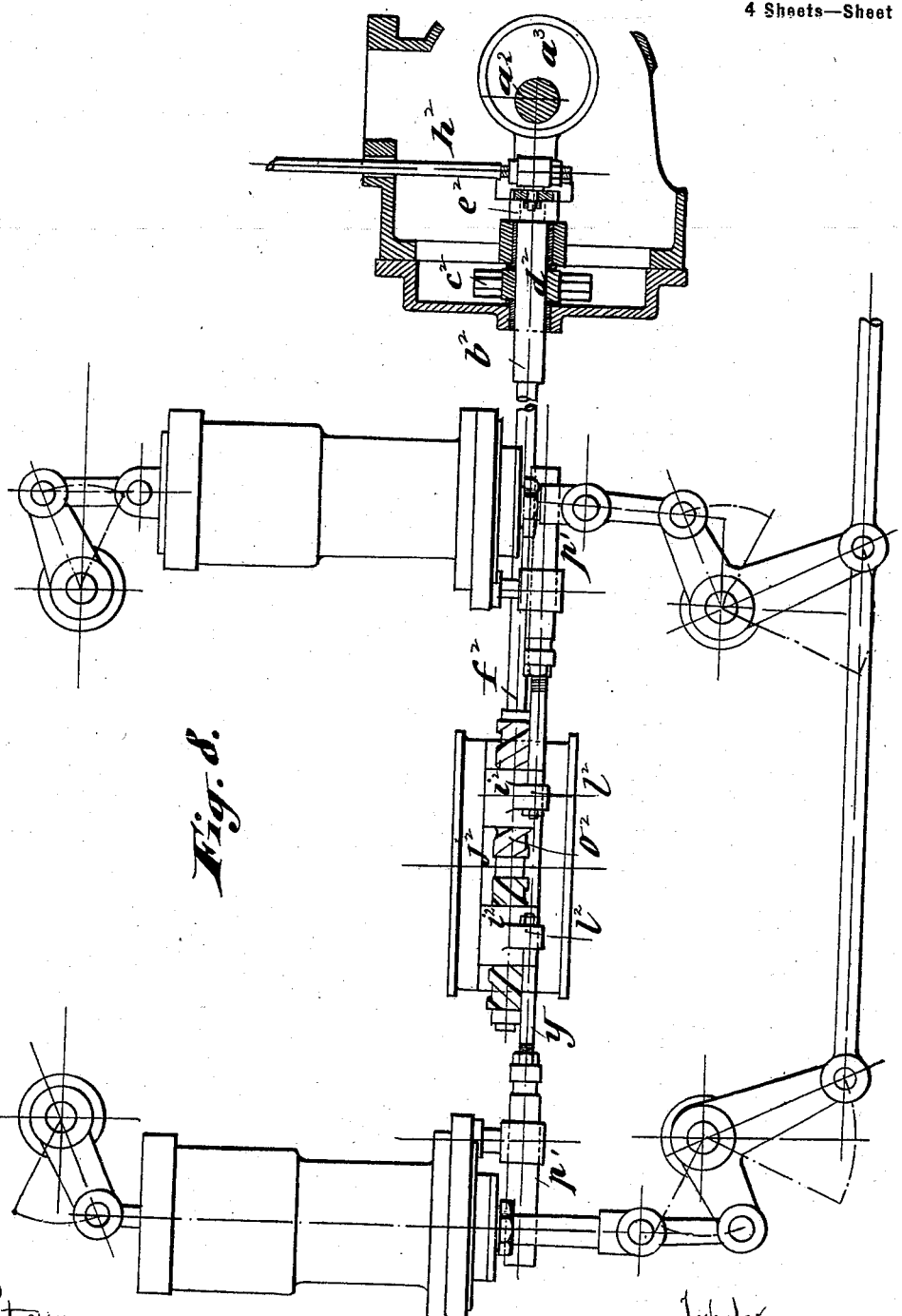

No. 648,370. Patented May 1, 1900.
G. AIMONT.
VALVE MECHANISM.
(Application filed Dec. 30, 1897.)
(No Model.) 4 Sheets—Sheet 4.
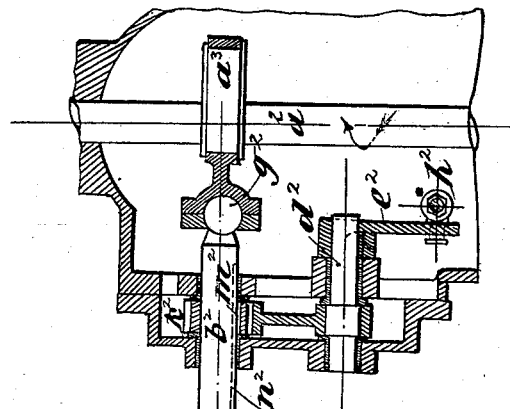
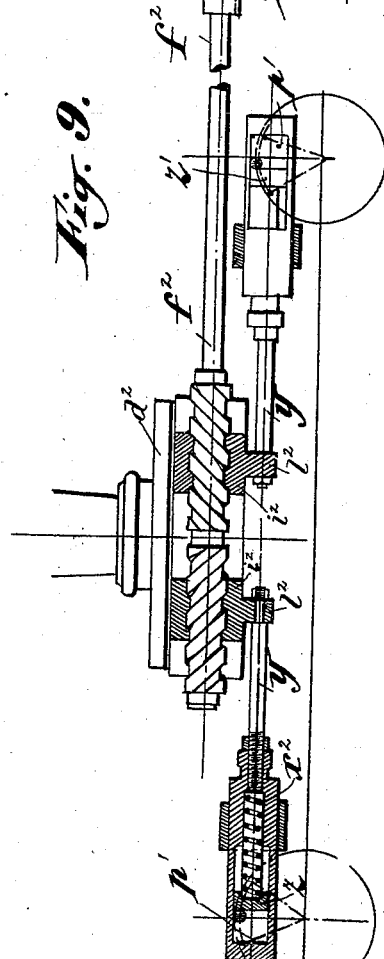
Fig. 9.
Fig. 10.
Witnesses
Inventor.
Gustave Aimont
per
Attorney.

UNITED STATES PATENT OFFICE.

GUSTAVE AIMONT, OF TIRLEMONT, BELGIUM.

VALVE MECHANISM.

SPECIFICATION forming part of Letters Patent No. 648,370, dated May 1, 1900.

Application filed December 30, 1897. Serial No. 664,658. (No model.)

*To all whom it may concern:*

Be it known that I, GUSTAVE AIMONT, a citizen of the Kingdom of Belgium, residing at Tirlemont, Belgium, have invented certain new and useful Improvements in Valve Mechanism, of which the following is a specification.

The present invention relates to an improved valve mechanism for steam or explosion engines or motors, one object being to provide a device of this kind in which an adjustable cam produces the closing of the admission by the quick return movement of the admission parts.
A further object of the invention is to provide mechanism which is readily applicable to any kind of admissions, substantial in construction, and very effective in operation.

The improvements consist in the construction, novel combination, and arrangement of parts fully described hereinafter and specifically pointed out in the appended claims.

Figure 7:
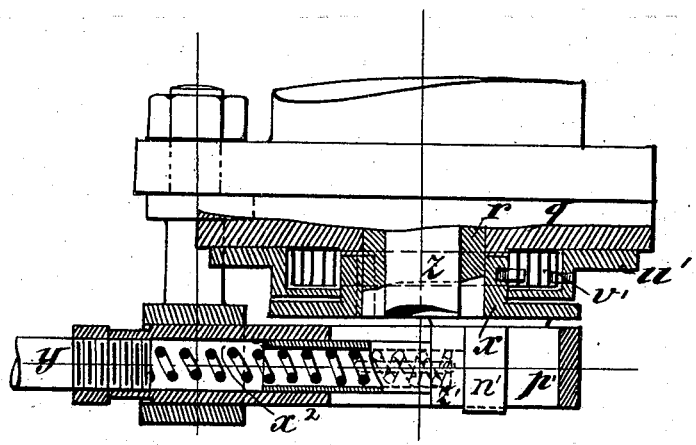
Figure 4:
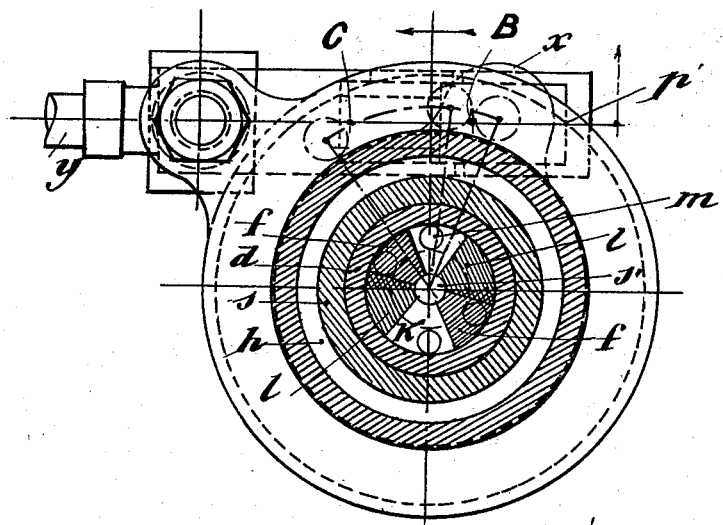

In the drawings forming a part of this specification, Figure 1 is a longitudinal section of the valve mechanism. Fig. 2 is a transverse section on line 1 2 of Fig. 1, partly broken away. Fig. 3 is a transverse section on line 5 6 of Fig. 1. Fig. 4 is a transverse section taken on a plane between the two above-named sections and passing through the parts marked $l$. Figs. 5 and 6 are transverse sections on different parallel planes of the box $u$ and valve $y$, Fig. 5 being a section on line 3 4 of Fig. 1, and Fig. 6 a section on line 7 8 of the same figure. Fig. 7 is a detail view, partly in elevation and partly in section, of the ungearer $x$ and proximate parts. Fig. 8 represents a side elevation of the ungearing mechanism, with the mechanism and casing at the right end partly in section. Fig. 9 represents a horizontal longitudinal section of the same, and Fig. 10 is a detail view of the transmission parts of the regulator.

Like letters refer to like parts throughout all the figures.

The improved valve mechanism comprises a cam, the upper or free part of which is connected with the admission member (valve or slide-valve) either directly or by means of suitable intermediates, the lower part of said cam being connected with an operating part of the motor to obtain the reciprocating movement and with an operating and regulating part by means of intermediate mechanism to obtain the cam motion produced by the closing of the admission by the quick return movement of the admission part. This quick return movement may be insured in different ways and automatically by means of balance-weights, springs, atmospheric pressure, &c.
In the apparatus hereinafter described I make use of the latter means, though other means, such as indicated, might be used for the same purpose. Such means being well known do not constitute a feature of my invention.

The invention further comprises a stroke-deadening device or liquid-brake, a special construction of which is shown in the accompanying drawings, and which is directly connected with the parts of the cam. However, said special construction may be connected with said cam parts by means of intermediates, so that the latter are not under the direct action of said brake device or other well-known liquid-brake devices may be substituted for the special construction, said brake devices being in direct or indirect connection with the cam parts.

The cam mechanism is composed of a piston $k$, provided with, preferably, two lugs or projections $l$ and movably arranged in a cylinder $d$. Said piston is actuated by means of a rod $r$, pivotally connected with a fork $i$, which in turn is connected with an operating part of the motor, (eccentric-rod or any other suitable part.) Above said piston $k$ is a stationary piston $e$, secured in place by means of longitudinal keys $u^2$ and adapted to be adjusted by means of a screw $o^2$, having a shoulder $p^2$ engaging a suitable recess provided in piston $b$, secured to cylinder $d$. The stationary portion $e$ is provided with lugs $f$, corresponding to the lugs $l$ of the piston $k$ and forming with the latter a circular or nearly-circular periphery to leave a certain play for the lugs $f$ at the moment of ungearing. The shank $t$ of said screw $o^2$ passes through the body of the piston $b$ and is held in the latter by means of a ring $q^2$, as shown. The square end $s^2$ of the shank $t$ serves to receive a key or handle for adjusting the stationary piston $e$. The shank $t$ is prevented from rotating accidentally in said piston $b$ by means of a set-screw $v^2$. The piston $b$ is provided with a pivot-pin $b^2$, serving to connect the cam mechanism to the valve-stem or the slide-valve rod, &c. The piston $b$ is arranged in a cylinder $c$, acting as a dash-pot and provided with a cock $n'$ for the outlet of air and with a cock $u$ for the return of liquid carried away by the cylinder $d$, as hereinafter described. Within the cylinder $e$ is a wall $s$, limiting the stroke of the piston $b$ and guiding the cylinder $d$ and the liquid-reservoir $h$ with cylinder $c$. The latter is closed at its lower end by means of a plate $q$, on which rests the wall $s$. An opening provided at the lower part of cylinder $c$ and normally closed by means of a screw-plug $o'$ serves for the outlet of liquid. The above-named liquid-reservoir $h$ is connected to the cylinder $d$ through passages $o$ and $o^3$ in the wall $s$ and through passage $p$ in cylinder $d$. The piston $k$ is furthermore provided with passages $m$, connecting the two faces thereof, and with a passage $s'$, passing through the rod $z$ to communicate the upper face of the piston $k$ with the bottom of cylinder $c$.

During the up movement of the piston $k$ the liquid flows under said piston through the passages $m$ to enter the reservoir $h$ and through the passages $s'$ to fill the bottom of the cylinder $c$ during the up movement of the cylinder $d$. When the lower rim of said cylinder $d$ has reached the openings $o^3$, the liquid flows directly from the reservoir $h$ into the lower part of the cylinder $c$. At the moment of ungearing the quick down movement of cylinder $d$ forces the liquid out from the lower part of said cylinder $c$ upon the upper face of piston $k$ through the passage $s'$, whence said liquid flows through the passages $m$ $p$ $o$ into the reservoir $h$. The liquid carried away by the cylinder $d$ into the upper part of the cylinder $c$ is forced into reservoir $h$ by means of the automatic cock $u$. Said cock is provided with a passage $g'$, connected to the upper part of the cylinder $c$, and with a passage $f'$, connected to the reservoir $h$. Between said passages $g'$ and $f'$ is arranged a valve $v$, secured to the bottom of cock $u$ by means of a nut $w$ and tightened at its upper part by means of a nut $c'$. The valve-body $v$ is provided with a chamber and vertical bore, in which the guide-piston $k'$, carrying the valve $a'$, may be moved, said valve $a'$ serving to communicate the said chamber with a transverse passage $e'$, connected to conduit $g'$ by means of the annular space $j'$. The said chamber is connected to the conduit $f'$ through two vertical passages $i'$. The valve $a'$ is held on its seating by the action of a spring $l'$ bearing against the piston $k'$ and the tension of which may be adjusted by means of the screw $d'$, through which passes the rod $m'$ of the piston $k'$, said rod being provided with a handle or equivalent $b'$. A screw-plug $h'$ closes normally the end of the conduit $f'$, through which liquid is introduced into the reservoir $h$. The liquid forced by the piston $b$ into the passage $g'$, the annular space $j'$, and the transverse passage $i$ raises the valve $a'$ and enters the above-named chamber, whence it flows through the vertical conduits $i'$ into the passage $f'$ and the reservoir $h$.

The rod $z$ of the piston $k$ is provided with a key $n$, adapted to slide in a longitudinal groove or way $g$ in a sleeve $r$, receiving at its lower end a packing-box $q'$, through which moves the rod $z$. Said sleeve $r$ is held by the plate $q$ of the cylinder $c$ and carries a plate $x$, provided with a coiled spring $v'$, housed within a box $u'$, secured to the cover-plate $q$.

The cylinder $d$ is provided with an annular shoulder $r'$, against which bears the piston $k$ when it reaches the lower end of its stroke, said shoulder serving to bring the admission-valve or slide-valve back when the same does not come back automatically by any accidental cause.

The plate $x$ is provided with a button $n'$, engaging a slot-like casing $p'$, connected with a rod $y$, operated by the regulating mechanism. (See Figs. 4, 7, 8, 9, and 10.) The casing $p'$ is composed of a frame in which is movably arranged a box $z'$, resting on a spring $x^2$, and against which bears said button $n'$. The rod $y$ is secured with its free end in an eye $l^2$ on the nut $i^2$, mounted on the screw $o^2$ and moving with the latter in the guide $j^2$. The screw $o^2$ is provided with a rod $f^2$, terminating in a shaft $b^2$, connected by means of a ball-and-socket joint $g^2$ with an eccentric-belt $a^3$, mounted on the shaft $a^2$ of the motor. The shaft $b^2$ is provided with a longitudinal groove $n^2$, in which slides the key $m^2$ of the gear-wheel $k^2$, meshing with the toothed sector $c^2$, mounted on a shaft $d^2$, actuated by the crank-arm $e^2$. The latter may be actuated by hand or connected with the regulator through the agency of the rod $h^2$. The eccentric $a^3$ moves the screw $o^2$, and therefore the slot-like casing $p'$, to constant distances, (indicated by the reference-letters B C in Fig. 4 of the accompanying drawings.) When the crank-arm $e^2$ is actuated by the regulator or by hand, the shaft $b^2$ will be rotated, and said shaft moves the nuts $i^2$ along the screw $o^2$, the slot-like casing $p'$ being moved to a supplemental distance, the maximum of which is indicated by B A in Fig. 4. The minimum displacement B C of said casing $p'$ corresponds to that position of the piston-lugs $l'$, Fig. 1, in which they are inserted between the lugs $f$ of piston $e$, the latter being stationary and the admission therefore nil. The minimum displacement A C of the slot-like casing $p'$ corresponds to that position of the lugs $l$ in which they are in front of the lugs $f$, so that the said lugs are arranged the one above the other during the whole stroke, the admission therefore taking place during the entire stroke of the motor-piston. Between these two extreme points I may obtain all intermediate admission degrees by adjusting the nuts $i^2$, and therefore the lugs $l$, automatically by means of the regulator or by hand. The lugs $l$ $f$ being in relative positions, such as indicated in Fig. 4, at the beginning of the upstroke of piston $k$, they will be moved away from each other at a given moment to produce the ungearing and the quick closing of the admission by the down movement of the piston e.

The minimum displacement B C of the casing p' corresponds (theoretically) to the upper position of the regulator. The maximum displacement corresponds to the lower position of the regulator.

Having thus described my invention, what I claim, and desire to secure by Letters Patent, is—

1. The improved valve mechanism comprising a lower piston provided with lugs and properly guided, an upper piston also provided with lugs and adjustably arranged above said lower piston and connected with the admission-valve, means for moving and rotating said lower piston, means for regulating the rotation of the lower piston, means for insuring the quick return movement of the upper piston and the admission-valve, and means for deadening the stroke of said upper piston, substantially as set forth.

2. The improved valve mechanism comprising a lower piston and an upper piston, both provided with lugs, a cylinder in which moves the lower piston and in which the upper piston may be adjusted, an air-piston secured on said cylinder and connected with the upper piston and the admission-valve, an air-cylinder, in which moves said air-piston serving to move the upper piston and the admission-valve quickly back when the lower and upper pistons are disengaged, means for moving and rotating said lower piston, means for regulating the rotation of the lower piston, and means for deadening the stroke produced by the quick return movement of said lower piston, substantially as set forth.

3. The improved valve mechanism comprising a lower piston and an upper piston both provided with lugs, a cylinder in which moves said lower piston and in which the upper piston may be adjusted, a liquid-reservoir around said cylinder, passages communicating said reservoir with the interior of said cylinder, passages extending through said lower piston, a passage between the lower part of the cylinder and the upper part of the reservoir, means for moving and rotating said lower piston, means for regulating the rotation of the lower piston, and means for insuring the quick return movement of the upper piston and the admission-valve, substantially as set forth.

4. The improved valve mechanism comprising a lower piston and an upper piston, both provided with lugs, a cylinder in which moves the lower piston and in which the upper piston may be adjusted, a liquid-reservoir around said cylinder, passages between the reservoir and the cylinder, an air-piston connected with said cylinder and the upper piston, an air-cylinder in which moves the said air-piston, a cock or equivalent for leading the liquid carried away by said air-cylinder back into the reservoir, a passage between said cock and the air-cylinder, a passage between the cock and the reservoir, a valve-body within said cock, a transverse passage in said valve-body and connected to the passage in the air-cylinder, a valve proper in said valve-body and above said cross-passage and serving to connect the latter to a chamber, vertical passages in said valve-body connecting said chamber to the passage of the reservoir, means for moving and rotating the lower piston, and means for regulating the rotation of said lower piston, substantially as set forth.

5. The improved valve mechanism comprising a lower piston and an upper piston both provided with lugs, a piston-rod on said lower piston, a sleeve keyed on said piston-rod, a plate having a button and arranged on said sleeve, a spring on said plate, a slot-like casing engaging said button, a rod connecting said casing with an operating part of the motor for rotating the lower piston, suitable mechanism for regulating the rotation of said piston, means for moving the lower piston, means for insuring the quick return movement of the upper piston and means for deadening the quick return stroke of said upper piston, substantially as set forth.

6. The improved valve mechanism comprising a lower piston and an upper piston both provided with lugs, suitable mechanism for rotating the lower piston, a screw adapted to rotate in a nut, connected with the said mechanism, a shaft in line with said screw and integral therewith, a ball-and-socket joint between said shaft and the operating part of the motor, a gear-wheel keyed longitudinally on said shaft, a toothed sector meshing with said gear-wheel, a crank-arm for actuating said sector, means for insuring the quick return movement of the upper piston and the admission-valve, and means for deadening the stroke of the return movement of said upper piston, substantially as set forth.

7. The improved valve mechanism comprising a lower piston and an upper piston both provided with lugs, suitable mechanism for rotating the lower piston, a screw adapted to rotate in a nut connected with said mechanism, a shaft in line with said screw and integral therewith, a ball-and-socket joint between said shaft and the operating part of the motor, a gear-wheel keyed longitudinally on said shaft, a toothed sector meshing with said gear-wheel, a crank-arm for actuating said sector, a rod connecting said crank-arm with the regulator, means for moving the lower piston, means for insuring the quick return movement of the upper piston and the admission-valve, and means for deadening the stroke of the quick return movement of said upper piston, substantially as set forth.

GUSTAVE AIMONT.

Witnesses:
CAMILLE ROLLAND,
AD STURM.